H. L. KIRSH.
FITTINGS FOR MOLDING PLANTS.
APPLICATION FILED JAN. 12, 1920.
1,352,815.
Patented Sept. 14, 1920.
2 SHEETS—SHEET 2.
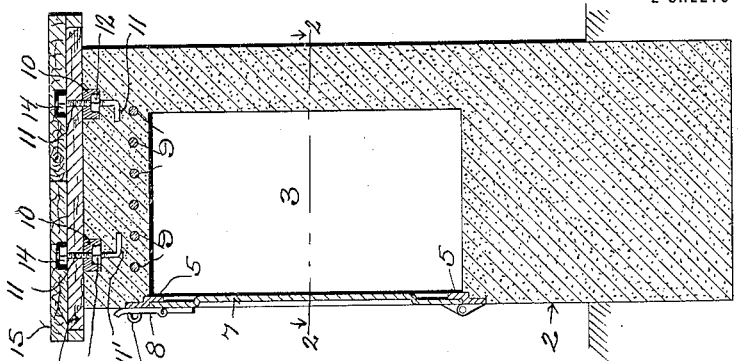
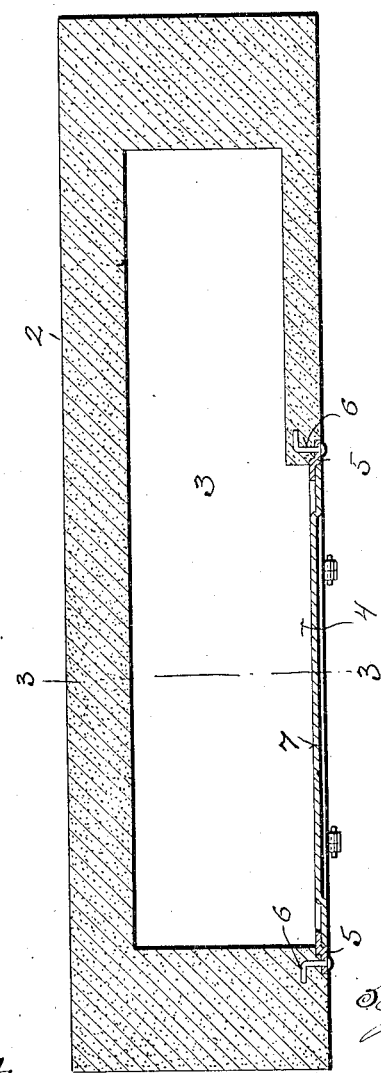

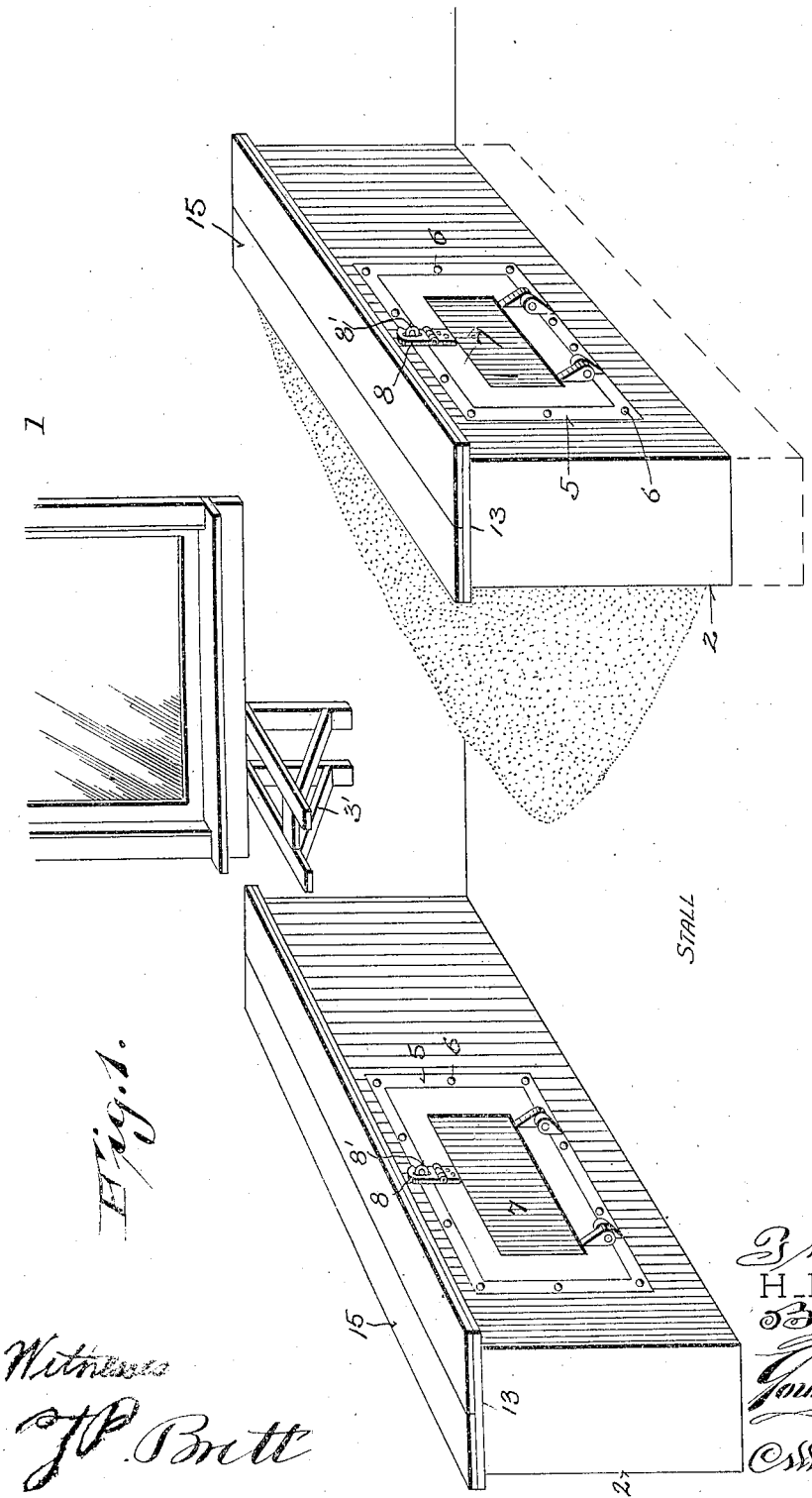

UNITED STATES PATENT OFFICE.

HUGH LESLIE KIRSH, OF BEAVER DAM, WISCONSIN.

FITTINGS FOR MOLDING PLANTS.

1,352,815.    Specification of Letters Patent.    Patented Sept. 14, 1920.

Application filed January 12, 1920. Serial No. 350,899.

*To all whom it may concern:*

Be it known that I, HUGH LESLIE KIRSH, a citizen of the United States, and resident of Beaver Dam, in the county of Dodge and State of Wisconsin, have invented certain new and useful Improvements in Fittings for Molding Plants; and I do hereby declare that the following is a full, clear, and exact description thereof.

My invention has for its object to provide simple, economical, durable and fireproof fittings for molding plants. The specific objects of my invention are to provide hollow cement partition walls which extend from the side walls of the building to form fireproof working stalls, one of the hollow walls forming a storage chamber for tools, patterns and the like, while the other wall constitutes a retainer for the workman's molding sand.

Another object is to provide the cement partition walls with removable smooth wood table tops for the reception of flasks and the like.

Another object is to provide anchors for the table tops.

A further object is to provide a metallic door and frame permanently secured to each wall and constituting a locker for the storage chamber formed therein.

With the above and minor objects in view, the invention consists in certain peculiarities of construction and combination of parts as are hereinafter set forth with reference to the accompanying drawings and subsequently claimed.

In the accompanying drawings:

Figure 1 represents a perspective view of a portion of a molding plant equipped with fittings embodying the features of my invention.

Fig. 2 is a detail sectional plan view of one of the hollow cement partition walls, the section being indicated by the line 2—2 of Fig. 3.

Fig. 3 is a cross section of the same, the section being indicated by the line 3—3 of Fig. 2.

Referring by characters to the drawings, 1 represents the side wall of a building having extended therefrom parallel partition walls 2 which are of predetermined length and height to most conveniently accommodate the structure to the work performed. Each pair of these walls thus constitutes an open ended compartment or stall for a molder, and in said compartment there is also provided a skeleton bench 3 which in this instance projects from the side wall of the building.

Referring more particularly to Figs. 2 and 3 of the drawings, each of the partition walls is formed of cement or analogous fireproof material and is preferably built up from a point at a predetermined distance below the floor line so as to form positive fire walls. The partition wall as shown in Figs. 2 and 3 is formed with a hollow storage chamber 3 therein having an opening 4 in one side wall around which opening is fitted a suitable metallic frame 5, which frame is anchored in place by L-shaped bolts 6 that are embedded in the concrete. The metallic frame has hinged thereto a downwardly opening door 7, which door is provided with a suitable hasp member 8 for engagement with a staple 8' that projects from the metallic frame, this hasp and staple being provided for the reception of a suitable lock whereby the workman may utilize the compartment for his personal set of special tools or patterns. The storage chamber thus provides the workman with a fireproof vault for valuable tools and patterns which may be otherwise damaged or lost in case of fire or theft. The blank side of a pair of these partition walls is presented to the next stall so that each workman has the use of a storage chamber and the use of a blank wall in his particular stall, against which blank wall the desired quantity of molding sand may be banked, and even though this molding sand is heated, it will not tend to ignite the structure due to its fireproof properties. The top of each chamber is supported by reinforcing bars 9 and the top of each wall has embedded therein four or more metallic lugs 10, the upper faces of which are flush with the top wall surface. Prior to these lugs being embedded into the green cement or concrete, each has fitted therein a threaded bolt 11 terminating at its lower end in a right angle foot 11' and the lug and bolt are connected by a nut 12 which is fitted in a countersunk aperture of the lug wall, the upper portion of the bolt projects through an aperture in said lug for the reception of a lower wood panel member 13. The panel member 13 is securely confined to the lug by a clamping bolt 14 and after this structure is assembled, finishing panels 15 are fitted over the panel 13 as is best shown in Fig. 3. These finishing panels are planed smoothly on their top surfaces and run lengthwise of the wall to constitute table surfaces for flasks or for working purposes. By this construction of table surface it is apparent that even though the same should wear or burn out, it can readily be replaced from time to time, as to renew them it is only necessary to first remove the upper panels 15 and after detaching the nuts 14, the lower panel surface can be also removed. The upper panel surfaces 15 as shown are provided with pockets for the reception of the retaining nuts so that the table is firmly supported and presents no external obstructions.

The equipment as just described has actually been put into practice and it has been found after testing to meet all of the requirements of a molding plant both as to fire conditions and as to the convenience of the workman, and while I have described the structure minutely as a detail, it is manifest that I do not wish to be confined to such minute details in carrying out the invention.

I claim:

In a molding plant having side walls, the combination of individual work stalls associated therewith, comprising a pair of parallel fire proof hollow walls extending from the side wall, the hollow wall constituting a storage chamber, each of which is provided with an opening in one side for communication with a stall, a fire proof closure for the opening, the opposite face of said wall being uninterrupted to constitute a support for the hot sand to be banked thereagainst, and wooden panels detachably secured to the upper surface of each wall to constitute a smooth surface molding table having a solid support thereunder.

In testimony that I claim the foregoing I have hereunto set my hand at Beaver Dam, in the county of Dodge and State of Wisconsin.

HUGH LESLIE KIRSH.